United States Patent
Günther et al.

(10) Patent No.: US 10,343,301 B2
(45) Date of Patent: Jul. 9, 2019

(54) PROCESS FOR PRODUCING A MOULDING USING A WATER-SOLUBLE CASTING MOULD AND MATERIAL SYSTEM FOR THE PRODUCTION THEREOF

(71) Applicants: VOXELJET AG, Friedberg (DE); FLUIDSOLIDS AG, Zürich (CH)

(72) Inventors: Daniel Günther, München (DE); Ingo Gnüchtel, Merching (DE); Beat Karrer, Zürich (CH)

(73) Assignees: VOXELJET AG, Friedberg (DE); FLUIDSOLIDS AG, Zürich (CH)

( * ) Notice: Subject to any disclaimer, the term of this patent is extended or adjusted under 35 U.S.C. 154(b) by 671 days.

(21) Appl. No.: 14/768,533

(22) PCT Filed: Feb. 18, 2014

(86) PCT No.: PCT/DE2014/000063
§ 371 (c)(1),
(2) Date: Aug. 18, 2015

(87) PCT Pub. No.: WO2014/131388
PCT Pub. Date: Sep. 4, 2014

(65) Prior Publication Data
US 2015/0375419 A1    Dec. 31, 2015

(30) Foreign Application Priority Data

Feb. 28, 2013 (DE) .................. 10 2013 003 303

(51) Int. Cl.
*B29C 64/165* (2017.01)
*B29C 64/10* (2017.01)
(Continued)

(52) U.S. Cl.
CPC .............. *B28B 7/342* (2013.01); *B28B 7/346* (2013.01); *B28B 7/36* (2013.01); *B29C 33/52* (2013.01);
(Continued)

(58) Field of Classification Search
None
See application file for complete search history.

(56) References Cited

U.S. PATENT DOCUMENTS

| | | |
|---|---|---|
| 3,913,503 A | 10/1975 | Becker |
| 4,247,508 A | 1/1981 | Housholder |

(Continued)

FOREIGN PATENT DOCUMENTS

| | | |
|---|---|---|
| AU | 720255 B2 | 5/2000 |
| CN | 101146666 A | 3/2008 |

(Continued)

OTHER PUBLICATIONS

US 4,937,420 A, 06/1990, Deckard (withdrawn)
(Continued)

*Primary Examiner* — Jeffrey M Wollschlager
*Assistant Examiner* — Armand Melendez
(74) *Attorney, Agent, or Firm* — The Dobrusin Law Firm, P.C.

(57) ABSTRACT

A method for producing molded parts (16), a water-soluble casting mold (6) being produced in a first step using a layering method, in particular using a powder bed-based layering method. In a second step, the surface of the casting mold (6) is sealed with the aid of a material (9; 10). A casting of the molded part (16) is then formed by filling the casting mold (6) with a free-flowing, hardenable material (13), in particular a hydraulically setting material. After the casting has solidified, the casting mold (6) is dissolved with the aid of an aqueous solution (18), in particular a heated aqueous (Continued)

solution (18). The present application furthermore relates to a material system for producing a water-soluble casting mold (6), comprising at least one water-soluble material for building a casting mold (6) in a layering method, as well as comprising at least one material (9; 10) for sealing the surface of the casting mold (6).

26 Claims, 3 Drawing Sheets

(51) Int. Cl.
*B28B 7/34* (2006.01)
*B28B 7/36* (2006.01)
*B29C 33/52* (2006.01)
*B29C 33/56* (2006.01)
*B29C 33/38* (2006.01)

(52) U.S. Cl.
CPC .............. *B29C 33/56* (2013.01); *B29C 64/10* (2017.08); *B29C 64/165* (2017.08); *B29C 33/3842* (2013.01)

(56) References Cited

U.S. PATENT DOCUMENTS

| | | |
|---|---|---|
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,089,186 A | 2/1992 | Moore |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,824,250 A * | 10/1998 | Whalen ................. C04B 35/622 264/219 |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A * | 12/1999 | Russell ................. B29C 41/12 425/130 |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,460,979 B1 | 10/2002 | Heinzl et al. |
| 6,476,122 B1 | 11/2002 | Leyden |
| 6,485,831 B1 | 11/2002 | Fukushima et al. |

(56) References Cited

U.S. PATENT DOCUMENTS

| | | | |
|---|---|---|---|
| 6,500,378 B1 | 12/2002 | Smith | |
| 6,554,600 B1 | 4/2003 | Hofmann et al. | |
| 6,596,224 B1 | 7/2003 | Sachs et al. | |
| 6,610,429 B2 | 8/2003 | Bredt et al. | |
| 6,616,030 B2 | 9/2003 | Miller | |
| 6,658,314 B1 | 12/2003 | Gothait | |
| 6,672,343 B1 | 1/2004 | Perret et al. | |
| 6,713,125 B1 | 3/2004 | Sherwood et al. | |
| 6,722,872 B1 | 4/2004 | Swanson et al. | |
| 6,733,528 B2 | 5/2004 | Abe et al. | |
| 6,742,456 B1 | 6/2004 | Kasperchik et al. | |
| 6,764,636 B1 | 7/2004 | Allanic et al. | |
| 6,827,988 B2 | 12/2004 | Krause et al. | |
| 6,830,643 B1 | 12/2004 | Hayes | |
| 6,838,035 B1 | 1/2005 | Ederer et al. | |
| 6,855,205 B2 | 2/2005 | McQuate et al. | |
| 6,896,839 B2 | 5/2005 | Kubo et al. | |
| 6,972,115 B1 | 12/2005 | Ballard | |
| 6,989,115 B2 | 1/2006 | Russell et al. | |
| 7,004,222 B2 | 2/2006 | Ederer et al. | |
| 7,037,382 B2 | 5/2006 | Davidson et al. | |
| 7,048,530 B2 | 5/2006 | Gaillard et al. | |
| 7,049,363 B2 | 5/2006 | Shen | |
| 7,087,109 B2 | 8/2006 | Bredt et al. | |
| 7,120,512 B2 | 10/2006 | Kramer et al. | |
| 7,137,431 B2 | 11/2006 | Ederer et al. | |
| 7,153,463 B2 | 12/2006 | Leuterer et al. | |
| 7,204,684 B2 | 4/2007 | Ederer et al. | |
| 7,220,380 B2 | 5/2007 | Farr et al. | |
| 7,291,002 B2 | 11/2007 | Russell et al. | |
| 7,296,990 B2 | 11/2007 | Devos et al. | |
| 7,332,537 B2 | 2/2008 | Bredt et al. | |
| 7,348,075 B2 | 3/2008 | Farr et al. | |
| 7,378,052 B2 | 5/2008 | Harryson | |
| 7,381,360 B2 | 6/2008 | Oriakhi et al. | |
| 7,387,359 B2 | 6/2008 | Hernandez et al. | |
| 7,402,330 B2 | 7/2008 | Pfeiffer et al. | |
| 7,431,987 B2 | 10/2008 | Pfeiffer et al. | |
| 7,435,072 B2 | 10/2008 | Collins et al. | |
| 7,435,368 B2 | 10/2008 | Davidson et al. | |
| 7,455,804 B2 | 11/2008 | Patel et al. | |
| 7,455,805 B2 | 11/2008 | Oriakhi et al. | |
| 7,497,977 B2 | 3/2009 | Nielsen et al. | |
| 7,531,117 B2 | 5/2009 | Ederer et al. | |
| 7,550,518 B2 | 6/2009 | Bredt et al. | |
| 7,578,958 B2 | 8/2009 | Patel et al. | |
| 7,597,835 B2 | 10/2009 | Marsac | |
| 7,641,461 B2 | 1/2010 | Khoshnevis | |
| 7,665,636 B2 | 2/2010 | Ederer et al. | |
| 7,722,802 B2 | 5/2010 | Pfeiffer et al. | |
| 7,807,077 B2 | 5/2010 | Ederer et al. | |
| 7,736,578 B2 | 6/2010 | Ederer et al. | |
| 7,748,971 B2 | 7/2010 | Hochsmann et al. | |
| 7,767,130 B2 | 8/2010 | Elsner et al. | |
| 7,795,349 B2 | 9/2010 | Bredt et al. | |
| 7,799,253 B2 | 9/2010 | Höchsmann et al. | |
| 7,879,393 B2 | 2/2011 | Ederer et al. | |
| 7,887,264 B2 | 2/2011 | Naunheimer et al. | |
| 7,927,539 B2 | 4/2011 | Ederer | |
| 8,020,604 B2 | 9/2011 | Hochsmann et al. | |
| 8,096,262 B2 | 1/2012 | Ederer et al. | |
| 8,186,415 B2 | 5/2012 | Marutani et al. | |
| 8,349,233 B2 | 1/2013 | Ederer et al. | |
| 8,506,870 B2 | 8/2013 | Hochsmann et al. | |
| 8,524,142 B2 | 9/2013 | Unkelmann et al. | |
| 8,574,485 B2 | 11/2013 | Kramer | |
| 8,715,832 B2 | 5/2014 | Ederer et al. | |
| 8,741,194 B1 | 6/2014 | Ederer et al. | |
| 8,911,226 B2 | 12/2014 | Gunther et al. | |
| 8,951,033 B2 | 2/2015 | Höchsmann et al. | |
| 8,956,140 B2 | 2/2015 | Hartmann | |
| 8,956,144 B2 | 2/2015 | Grasegger et al. | |
| 8,992,205 B2 | 3/2015 | Ederer et al. | |
| 9,174,391 B2 | 11/2015 | Hartmann et al. | |
| 9,174,392 B2 | 11/2015 | Hartmann | |
| 9,242,413 B2 | 1/2016 | Hartmann et al. | |
| 9,321,934 B2 | 4/2016 | Mögele et al. | |
| 9,327,450 B2 | 5/2016 | Hein et al. | |
| 9,333,709 B2 | 5/2016 | Hartmann | |
| 9,358,701 B2 | 6/2016 | Gnuchtel et al. | |
| 2001/0045678 A1 | 11/2001 | Kubo et al. | |
| 2001/0050031 A1 | 12/2001 | Bredt et al. | |
| 2002/0015783 A1 | 2/2002 | Harvey | |
| 2002/0016387 A1 | 2/2002 | Shen | |
| 2002/0026982 A1 | 3/2002 | Bredt et al. | |
| 2002/0079601 A1* | 6/2002 | Russell | B29C 41/12 264/40.1 |
| 2002/0090410 A1 | 7/2002 | Tochimoto et al. | |
| 2002/0111707 A1 | 8/2002 | Li et al. | |
| 2002/0155254 A1 | 10/2002 | McQuate et al. | |
| 2002/0167100 A1 | 11/2002 | Moszner et al. | |
| 2003/0004599 A1 | 1/2003 | Herbak | |
| 2003/0065400 A1 | 4/2003 | Beam et al. | |
| 2003/0069638 A1 | 4/2003 | Barlow et al. | |
| 2003/0083771 A1 | 5/2003 | Schmidt | |
| 2003/0113729 A1 | 6/2003 | DaQuino et al. | |
| 2003/0114936 A1 | 6/2003 | Sherwood et al. | |
| 2004/0003738 A1 | 1/2004 | Imiolek et al. | |
| 2004/0012112 A1 | 1/2004 | Davidson et al. | |
| 2004/0025905 A1 | 2/2004 | Ederer et al. | |
| 2004/0026418 A1 | 2/2004 | Ederer et al. | |
| 2004/0035542 A1 | 2/2004 | Ederer et al. | |
| 2004/0036200 A1 | 2/2004 | Patel et al. | |
| 2004/0038009 A1 | 2/2004 | Leyden et al. | |
| 2004/0045941 A1 | 3/2004 | Herzog et al. | |
| 2004/0056378 A1 | 3/2004 | Bredt et al. | |
| 2004/0084814 A1 | 5/2004 | Boyd et al. | |
| 2004/0094058 A1 | 5/2004 | Kasperchik et al. | |
| 2004/0104515 A1 | 6/2004 | Swanson et al. | |
| 2004/0112523 A1 | 6/2004 | Crom | |
| 2004/0138336 A1 | 7/2004 | Bredt et al. | |
| 2004/0145088 A1 | 7/2004 | Patel et al. | |
| 2004/0170765 A1 | 9/2004 | Ederer et al. | |
| 2004/0187714 A1 | 9/2004 | Napadensky et al. | |
| 2004/0207123 A1 | 10/2004 | Patel et al. | |
| 2004/0239009 A1 | 12/2004 | Collins et al. | |
| 2005/0003189 A1 | 1/2005 | Bredt et al. | |
| 2005/0017386 A1 | 1/2005 | Harrysson | |
| 2005/0017394 A1 | 1/2005 | Hochsmann et al. | |
| 2005/0046067 A1* | 3/2005 | Oriakhi | B28B 1/00 264/113 |
| 2005/0074511 A1 | 4/2005 | Oriakhi et al. | |
| 2005/0093194 A1 | 5/2005 | Oriakhi et al. | |
| 2005/0167872 A1 | 8/2005 | Ederer et al. | |
| 2005/0174407 A1 | 8/2005 | Johnson et al. | |
| 2005/0179167 A1 | 8/2005 | Hachikian | |
| 2005/0212163 A1 | 9/2005 | Bausinger et al. | |
| 2005/0218549 A1 | 10/2005 | Farr et al. | |
| 2005/0219942 A1 | 10/2005 | Wallgren | |
| 2005/0280185 A1 | 12/2005 | Russell et al. | |
| 2005/0283136 A1 | 12/2005 | Skarda | |
| 2006/0013659 A1 | 1/2006 | Pfeiffer et al. | |
| 2006/0105102 A1 | 5/2006 | Hochsmann et al. | |
| 2006/0108090 A1 | 5/2006 | Ederer et al. | |
| 2006/0159896 A1 | 7/2006 | Pfeifer et al. | |
| 2006/0176346 A1 | 8/2006 | Ederer et al. | |
| 2006/0208388 A1 | 9/2006 | Bredt et al. | |
| 2006/0237159 A1 | 10/2006 | Hochsmann | |
| 2006/0251535 A1 | 11/2006 | Pfeifer et al. | |
| 2006/0254467 A1 | 11/2006 | Farr et al. | |
| 2006/0257579 A1 | 11/2006 | Farr et al. | |
| 2007/0045891 A1 | 3/2007 | Martinoni | |
| 2007/0054143 A1 | 3/2007 | Otoshi | |
| 2007/0057412 A1 | 3/2007 | Weiskopf et al. | |
| 2007/0065397 A1 | 3/2007 | Ito et al. | |
| 2007/0126157 A1 | 6/2007 | Bredt | |
| 2007/0215020 A1 | 9/2007 | Miller | |
| 2007/0238056 A1 | 10/2007 | Baumann et al. | |
| 2008/0001331 A1 | 1/2008 | Ederer | |
| 2008/0018018 A1 | 1/2008 | Nielsen et al. | |
| 2008/0047628 A1 | 2/2008 | Davidson et al. | |
| 2008/0138515 A1 | 6/2008 | Williams | |
| 2008/0187711 A1 | 8/2008 | Alam et al. | |
| 2008/0233302 A1 | 9/2008 | Elsner | |

(56) References Cited

U.S. PATENT DOCUMENTS

| | | |
|---|---|---|
| 2008/0237933 A1 | 10/2008 | Hochsmann et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0011066 A1 | 1/2009 | Davidson et al. |
| 2009/0068376 A1 | 3/2009 | Philippi et al. |
| 2009/0261497 A1 | 10/2009 | Ederer et al. |
| 2010/0007062 A1 | 1/2010 | Larsson et al. |
| 2010/0026743 A1 | 2/2010 | Van Thillo et al. |
| 2010/0152865 A1 | 6/2010 | Jonsson et al. |
| 2010/0207288 A1 | 8/2010 | Dini |
| 2010/0212584 A1 | 8/2010 | Ederer et al. |
| 2010/0243123 A1 | 9/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann |
| 2012/0113439 A1 | 5/2012 | Ederer |
| 2012/0126457 A1 | 5/2012 | Abe et al. |
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0318251 A1 | 3/2016 | Ederer et al. |
| 2016/0107386 A1 | 4/2016 | Hartmann et al. |
| 2016/0114533 A1 | 4/2016 | Grassegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2017/0028630 A1 | 2/2017 | Ederer et al. |
| 2017/0050378 A1 | 2/2017 | Ederer |
| 2017/0050387 A1 | 2/2017 | Ederer |
| 2017/0106595 A1 | 4/2017 | Gunther et al. |
| 2017/0136524 A1 | 5/2017 | Ederer et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0197367 A1 | 7/2017 | Ederer et al. |
| 2017/0210037 A1 | 7/2017 | Ederer et al. |
| 2017/0217098 A1 | 8/2017 | Hartmann et al. |
| 2017/0297263 A1 | 10/2017 | Ederer et al. |
| 2017/0305139 A1 | 10/2017 | Hartmann |
| 2017/0326693 A1 | 11/2017 | Ederer et al. |
| 2017/0355137 A1 | 12/2017 | Ederer et al. |
| 2018/0079133 A1 | 3/2018 | Ederer et al. |
| 2018/0141271 A1 | 5/2018 | Gunther et al. |
| 2018/0141272 A1 | 5/2018 | Hartmann et al. |
| 2018/0169758 A1 | 6/2018 | Ederer et al. |
| 2018/0222082 A1 | 8/2018 | Gunther et al. |
| 2018/0222174 A1 | 8/2018 | Guneter et al. |

FOREIGN PATENT DOCUMENTS

| | | |
|---|---|---|
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4 325 573 | 2/1995 |
| DE | 29506204 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69125064 T2 | 7/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 102005019699 B3 | 1/2007 |
| DE | 10 2006 040 305 A1 | 3/2007 |
| DE | 102006029298 A1 | 12/2007 |
| DE | 102007040755 A1 | 3/2009 |
| DE | 102007047326 A1 | 4/2009 |
| DE | 102011053205 A1 | 3/2013 |
| DE | 102015006363 A1 | 12/2016 |
| DE | 102015008860 A1 | 1/2017 |
| DE | 102015011503 A1 | 3/2017 |
| DE | 102015011790 A1 | 3/2017 |
| EP | 361847 B1 | 4/1990 |
| EP | 1415792 | 5/2004 |
| EP | 1457590 A | 9/2004 |
| EP | 1381504 B1 | 8/2007 |
| EP | 1974838 A1 | 10/2008 |
| FR | 515824 A | 4/1981 |
| GB | 2297516 A | 8/1996 |
| JP | S62275734 A | 11/1987 |
| JP | 2003136605 A | 5/2003 |
| JP | 2004/082206 A | 3/2004 |
| JP | 2009/202451 A | 9/2009 |
| JP | 2009202451 A | 9/2009 |
| WO | 90/03893 A1 | 4/1990 |
| WO | 01/40866 A2 | 6/2001 |
| WO | 2001/078969 A2 | 10/2001 |
| WO | 2004/014637 A1 | 2/2004 |
| WO | 2006/100166 A1 | 9/2006 |
| WO | 2008/049384 A1 | 5/2008 |
| WO | 2008061520 A2 | 5/2008 |
| WO | 2011063786 A1 | 6/2011 |
| WO | 2013075696 A1 | 5/2013 |
| WO | 2014090207 A1 | 6/2014 |
| WO | 2014166469 A1 | 10/2014 |
| WO | 2015078430 A1 | 6/2015 |
| WO | 2015081926 A1 | 6/2015 |
| WO | 2015085983 A2 | 6/2015 |
| WO | 2015090265 A1 | 6/2015 |
| WO | 2015090567 A1 | 6/2015 |
| WO | 2015096826 A1 | 7/2015 |
| WO | 2015149742 A1 | 10/2015 |

(56) References Cited

FOREIGN PATENT DOCUMENTS

| WO | 2015180703 | A1 | 12/2015 |
|---|---|---|---|
| WO | 2016019937 | A1 | 2/2016 |
| WO | 2016019942 | A1 | 2/2016 |
| WO | 2016058577 | A1 | 4/2016 |
| WO | 2016095888 | A1 | 6/2016 |
| WO | 2016101942 | A1 | 6/2016 |
| WO | 2016146095 | A1 | 9/2016 |

OTHER PUBLICATIONS

International Search Report, Application No. PCT/DE2014/000063, dated Jul. 23, 2014.
International Preliminary Report on Patentability and Written Opinion of the International Search Authority, Application No. PCT/DE2014/000063, dated Sep. 1, 2015.
Cima et al., "Computer-derived Microstructures by 3D Printing: Bio- and Structural Materials," SFF Symposium, Austin, TX, 1994.
Marcus, et al., Solid Freeform Fabrication Proceedings, Sep. 1995, p. 130-133.
Gebhart, Rapid Prototyping, pp. 118-119, 1996.
Feature Article—Rapid Tooling—Cast Resin and Sprayed Metal Tooling by Joel Segal, Apr. 2000.
EOS Operating Manual for Laser Sintering Machine with Brief Summary Feb. 22, 2005.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Sachs et al., "Three-Dimensional Printing: Rapid Tooling and Prototypes Directly from a CAD Model", Massachusetts Institute of Technology, pp. 143-151, Jan. 1990.
Williams, "Feasibility Study of Investment Casting Pattern Design by Means of Three Dimensional Printing", Department of Mechanical Engineering, abstract only; Sep. 25, 2001.
Armin Scharf, "Erster 3D-Endlosdrucker", zwomp.de, http://www.zwomp.de/2012/11/06/voxeljet-endlosdrucker/ dated Nov. 6, 2012.
Voxeljet's VXconcept—Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.
Screen shots of URL: http://www.youtube.com/watch?v=hgIrNXZjIxU taken in approximately 5 second intervals on Nov. 12, 2015.
Jacobs et al., 2005 SME Technical Paper, title "Are QuickCast Patterns Suitable for Limited Production?"
European Office Action, EP Application No. 14717982.4 dated Sep. 9, 2017.
European Office Action, EP Application No. 14717982.4 dated Jul. 9, 2018.

\* cited by examiner

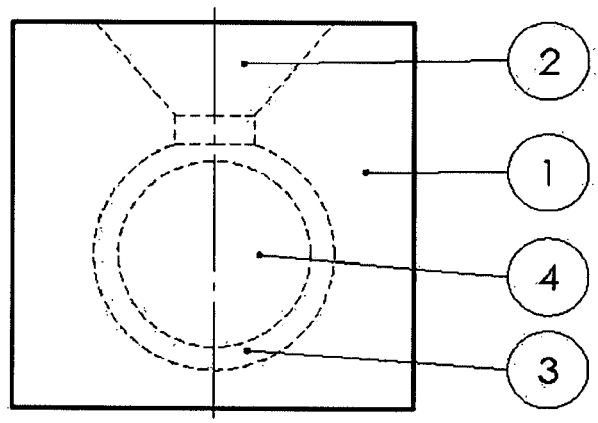
Fig. 1
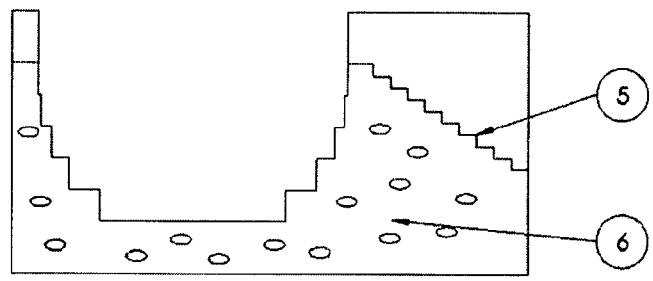
Fig. 2
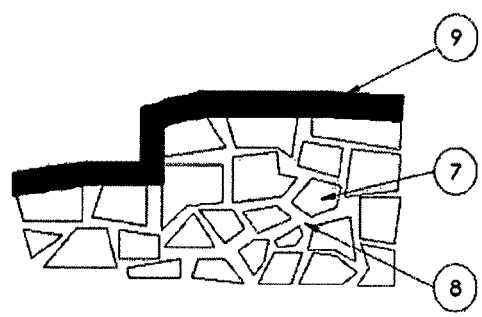 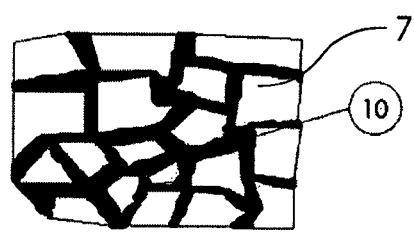
Fig. 3a          Fig. 3b

PROCESS FOR PRODUCING A MOULDING USING A WATER-SOLUBLE CASTING MOULD AND MATERIAL SYSTEM FOR THE PRODUCTION THEREOF

CLAIM OF PRIORITY

This application is a national phase filing under 35 USC § 371 from PCT Application serial number PCT/DE2014/000063 filed on Feb. 18, 2014, and claims priority therefrom. This application further claims priority from German Patent Application DE 10 2013 003 303.9 filed on Feb. 28, 2013. PCT Application Number PCT/DE2014/000063 and German Patent Application Number DE 10 2013 003 303.9 are each incorporated herein in their entireties by reference.

TECHNICAL FIELD

The invention relates to a method for producing a molded part using a water-soluble casting mold as well as a material system for the production thereof.

BACKGROUND INFORMATION

Plastic parts that are produced using known injection-molding methods are characterized by high strengths as well as good surface qualities and low production costs. The same applies to components made of cast concrete, gypsum or other hardening materials. However, the production of corresponding casting molds is relatively expensive, since they require a high degree of precision.

Methods for building objects in layers, for example 3D printing methods, such as rapid prototyping, make it possible to produce objects with a good level of precision quickly and cost-effectively. It would therefore be desirable to use methods of this type to produce casting molds for hardening materials. However, the porosity of the casting mold produced using a layering method has a negative effect on the surface quality as well as on the setting and mold filling behavior of hardening materials.

The problem of breaking a casting out of the mold has also not been satisfactorily solved up to now.

DE 691 25 064 T2 describes a method for casting a product in a mold using complex shapes such as undercuts or cavity configurations. In this method, water-soluble casting mold cores made of a particulate material as well as a water-soluble carbohydrate, which may be dissolved with water after casting, are produced. However, the castable materials do not penetrate the mold, since the latter is not porous on the boundary surface.

DE 195 25 307 A1 discloses a casting core which is produced from a dry substance which is solidified with the aid of a binder. The casting core is dissolved and washed out with the aid of water after a casting is produced. The casting core is produced from dry sand or perlite as well as from disodium phosphate as the water-soluble binder.

DE 10 2005 019 699 B3 describes a method for producing a three-dimensional object from metal salt particles as a casting mold or casting core. For this purpose, the three-dimensional object is used in a layering method made of particles which comprise monovalent or polyvalent, water-soluble and/or alcohol-soluble metal salts.

None of the cited prior-art documents discloses or suggests the present invention.

A crucial disadvantage in using casting molds produced using a powder bed-based layering method is the porosity thereof, which results from the use of a powder material. This porosity in an obstacle to the production of exact and dimensionally accurate castings from hydraulically setting materials.

Another disadvantage of known methods is the ability [sic; disability] to easily and completely separate the molds needed for the casting process from the molded part to be produced. Moreover, absorbent components according to the prior art are not suitable for processing hydraulically bound casting materials.

SUMMARY OF THE INVENTION

The object of the invention is to provide a method belonging to the technical field mentioned at the outset, which makes it possible to produce a molded part with the aid of a casting mold produced using a layering method, a precise and dimensionally accurate casting as well as a simple breakout of the molded part from the mold being facilitated, or at least for the purpose of reducing or entirely avoiding the disadvantages of the prior art.

The achievement of the object is defined by the features in Claim 1. According to the invention, a water-soluble casting mold is produced in a first step, using a layering method. In particular, the casting mold is preferably produced using a powder bed-based layering method. The surface of the casting mold is sealed with a water-insoluble material in a second step. A casting of the molded part is subsequently produced by filling the casting mold with a free-flowing, hardening material. After the casting solidifies, the casting mold is dissolved with the aid of an aqueous solution, which may be, in particular, heated.

Due to the sealing with the water-insoluble material, pores which are present in the casting mold may be closed and a possible surface roughness of the casting mold may be smoothed out. As a result, a smooth surface, which facilitates a dimensionally accurate and precise casting, may be produced even in casting molds produced in a powder bed-based layering method. Since the casting mold is made from a water-soluble material, it may be easily and quickly removed from the solidified molded part with the aid of an aqueous solution, it being possible to simultaneously wash off the water-insoluble material used for sealing from the molded part. It was also surprisingly determined that, due to the sealing process, no significant penetration of the surface of the casting mold by the free-flowing, hardening material occurs.

The invention thus advantageously provides complex casting molds, which may be easily, quickly and cost-effectively produced with the aid of 3D printing. Furthermore, not only is it possible to produce complex casting molds with the aid of the casting molds produced according to the invention, but it is also possible to implement undercuts in the casting, due to the way in which the casting mold may be removed after casting.

It was surprising that the washing-off step is easy to carry out in this manner and that the casting mold may be completely removed. Due to the method according to the invention, the component may thus be quickly and completely removed in a cost-effective work step, using small amounts of material, energy and time.

It was furthermore surprising that it was easy to produce the seal and that very good casting results could be achieved. Instead, one would have expected to see a significant penetration of the seal and the casting mold by the casting material and the casting inaccuracies to be anticipated thereby. However, this was not the case in the method steps used in the method according to the invention and with the sealing process selected, and very good casting qualities could be achieved. Therefore, surprisingly good surfaces may be achieved within a wide process window.

Using the method according to the invention and the special combination of materials, it is now possible to avoid the porosity resulting during 3D printing as well as negative and undesirable inaccuracies for a casting. Unexpectedly, very high surface qualities may be achieved with the aid of the method according to the invention, which facilitate a high accuracy in the casting step.

A "water-soluble material" within the meaning of this application is understood to be a material which dissolves completely in the presence of excess water or aqueous solution. Excess is understood to mean that the volume of the water or the aqueous solution is at least equal to or greater than the volume of the material to be dissolved. In particular, the solubility of the water-soluble material is greater than 1 g per liter.

The casting has at least one negative impression of the outer shape of the molded part to be produced. The casting mold produced using the layering method preferably also includes a core which forms an inner shape or a cavity within the molded part to be produced. In particular, the casting mold according to the invention has complex geometric shapes, such as undercuts.

All layering methods known from the prior art may be used as the layering method, for example fused deposition modeling. In this method, the water-soluble material is applied in layers by means of an extruder nozzle which is movable in space. However, a powder bed-based layering method is particularly preferably used, in which a particulate material is applied in thin layers onto a platform, and a computer-controlled print head selectively prints areas with a binder on the basis of a digital data record for the purpose of bonding these areas. The excess particulate material which was not bonded at the end of the method may subsequently be removed from the bonded material and, e.g., reused.

In principle all materials known from the prior art for 3D printing may be used as particulate material, e.g., sand, gypsum, thermoplastics as well as metal, mineral, silicate or ceramic powders. The term "particulate material" used within the scope of this application includes both granular materials and fiber materials, such as cellulose fibers, wood fibers, grass fibers, etc. A water-soluble binder is used as the binder, such as at least a polysaccharide, a protein, a salt, a silicate, a tannin, polyvinyl acetate, polyvinyl alcohol, polyvinylpyrrolidone or a mixture thereof.

The casting mold is preferably cleaned before sealing the surface with the aid of the water-insoluble material. Moreover, the surface of the casting mold may also be mechanically processed, e.g., by grinding, prior to sealing.

"Water-insoluble material" within the meaning of the present application is understood to be a material which has no or only a very slight solubility in water, e.g., less than 1 g per liter. To avoid possible deformations of molded parts produced from a hardening material having a low glass transition temperature when dissolving the casting mold with hot water, very low-melt waxes or fats may be used, in particular.

"Hardening material" in the sense of the present application is understood to be a material which transitions from a free-flowing state to a hardened state by means of a chemical reaction. It is preferably a material in which a polymerization reaction takes place, in particular by means of polycondensation, polyaddition or ionic polymerization. In particular, the hardening material preferably comprises a hydraulically setting material, i.e., a material that has hydroscopic characteristics and stores water as water of crystallization in a crystalline structure, the material hardening due to the formation of a crystalline structure.

The material preferably includes cement-bound materials, zinc phosphate cement, gypsum, calcium sulphate (anhydrite) as well as polyurethanes, epoxy resins, polystyrenes, polyacrylates, polyamides, polyester and/or polyimides as well as biodegradable plastics. It is understood that the hardenable material with which the casting mold is filled comprises the base materials of the hardened material or the monomers of the corresponding polymers. Therefore, for example, [sic; it comprises] an isocyanate as well as a polyol for forming polyurethane. To generate a casting of the molded part, the material is free-flowing, i.e., it has a viscosity which is low enough to allow the casting mold to be filled with the material.

In principle, all systems are suitable which do not require the removal of a solvent in order to solidify. This includes all two-component plastic systems. In one particularly preferred specific embodiment, a fiberglass reinforcement is introduced into a casting mold, and the casting mold is subsequently filled with two-component casting polyurethane. For materials which demonstrate a strong exothermic reaction during hardening, the casting mold may be additionally cooled from the outside in order to avoid melting the water-insoluble material used to seal the surface of the casting mold.

"Aqueous solution" within the meaning of the present invention is understood to be solutions which contain water in a volume proportion of more than 50%, preferably more than 75%. Pure water is particularly preferably used as the aqueous solution, in particular distilled water.

The aqueous solution is particularly preferably heated for dissolving the casting mold, i.e., it has a higher temperature than the typical room temperature of 20° C., e.g., 80° C. In particular, a temperature is selected, which is above the melting temperature of the water-insoluble material used. As a result, the water-insoluble material may be quickly and reliably removed from the casting of the molded part at the same time that the casting mold is dissolved.

The selection of the material used for the production of the water-soluble casting mold as well as the selection of the water-insoluble material preferably take place in such a way that these materials may be easily separated from the aqueous solution after the casting mold has been dissolved and reused individually. For example, the water-insoluble material may be crystallized out after the aqueous solution has cooled, and the water-soluble material of the casting mold may be filtered out of the aqueous solution.

The casting mold is preferably produced in a 3D printing process. It is particularly preferably produced in a power bed-based 3D printing process.

The surface of the casting mold is preferably sealed with the water-insoluble material by immersion in a bath, by spraying it on and/or by brushing it on. The water-insoluble material is preferably liquefied prior to sealing by heating it above the melting temperature. Alternatively, the water-insoluble material may also be dissolved with the aid of a volatile, organic solvent and be applied to the surface of the casting mold as an organic solution, a layer of the water-insoluble material remaining on the surface of the casting mold after the solvent has completely evaporated.

Underpressure or overpressure is preferably applied to the casting mold while it is being filled with the material, and/or it is subjected to a shaking motion or a temperature increase. This makes it possible to ensure that the negative impression of the molded part present in the casting mold is completely filled with the free-flowing, hardening material.

If a cement-bound material is used, it is possible, in particular, to include reinforcements in the casting. These reinforcements may be designed as wire meshes, fiberglass fabric or comparable structures. However, the cement material must be set to a low viscosity for filling the casting mold. Flow improvement additives as well as spherical aggregates or special sands, known from the prior art, are suitable for this purpose. By additionally introducing hollow glass balls, molded parts may be produced from extremely light-weight cement materials, using the method according to the invention.

A reinforcement may, but does not have to, take place. Likewise, other fillers may be added to the material, in particular short fibers or nanoparticles, for the purpose of reinforcing the molded part.

In particular, elastic molded parts may be preferably produced using the method according to the invention. Two-component silicones are particularly suitable for this purpose, due to their comparatively low viscosity.

The casting mold is preferably dissolved by immersing the casting mold in a bath containing the aqueous solution. The dissolution is preferably accelerated by means of movements of the casting mold within the bath or by a temperature increase and/or by applying ultrasound.

The casting mold may be actively moved in the bath, e.g., by shifting it back and forth by hand. Alternatively, the bath may be placed on a rocker, or the aqueous solution may be set into motion with the aid of a mixing device. The temperature increase preferably takes place by means of an external heat source onto which the bath is placed or with the aid of an immersion heating system. The application of ultrasound preferably takes place in a commercially available ultrasonic bath.

The dissolution of the casting mold particularly preferably takes place in an autoclave. Due to the overpressure produced in the autoclave and the high heat of the steam, a casting mold according to the invention and the water-insoluble material used for sealing may be quickly removed without residue from the casting of the molded part.

In particular, a casting polyamide is used as the water-insoluble material. "Casting polyamide" is understood to be a thermoplastic material, which is obtained from caprolactam by ionic polymerization.

Another object of the present invention is to provide a material system for producing water-soluble casting molds, which are used, in particular, in the method according to the invention. The material system includes at least one water-soluble material for building the casting mold in a layering method as well as at least one water-insoluble material for sealing the surface of the casting mold. The water-soluble material comprises at least one particulate material as well as at least one water-soluble binder.

This material system may be used to produce a casting mold in the layering method, which may be easily dissolved in an aqueous solution after generating a casting of the molded part to be produced, both the breakout from the mold and the formation of complex shapes, such as undercuts, or a core being simplified thereby.

The at least one binder preferably comprises an inorganic compound. In particular, the at least one binder preferably comprises sodium and/or potassium silicates. These silicates, which are also known under the name "water glass," are highly water-soluble and are not at all toxic. The at least one binder may also preferably comprise sheet silicates.

The at least one binder preferably comprises at least one polysaccharide, in particular sucrose or starch, at least one protein, at least one silicate, at least one salt and/or at least one water-soluble polymer, in particular polyvinyl alcohol, polyvinyl acetate or polyvinylpyrrolidone or a mixture thereof.

Polysaccharides may be used as an environmentally compatible and nontoxic binder, in particular by means of recrystallization, e.g., by cooling a previously heated supersaturated solution.

The water-insoluble material preferably comprises wax, at least one fatty acid, at least one water-insoluble polymer, stearyl alcohol and/or cetyl alcohol or a mixture thereof.

Suitable waxes are, for example, animal waxes such as beeswax or plant waxes such as carnauba wax. However, a synthetic wax such as paraffin is preferably used, due to the price.

Another aspect of the present invention relates to a casting mold which is produced from the material system according to the invention. A casting mold of this type may be easily and quickly produced by a layering method, it being possible to produce a precise and dimensionally accurate casting of a molded part by sealing the surface of the casting mold with the water-insoluble material. The casting mold may be subsequently easily and quickly removed by applying an aqueous solution.

Another aspect of the present invention relates to a molded part which is produced by a method according to the invention.

Other advantageous specific embodiments and feature combinations of the invention are derived from the following detailed description and the totality of the patent claims.

BRIEF DESCRIPTION OF THE DRAWINGS

In the drawings used to explain the exemplary embodiment:

FIG. 1 shows a casting mold, which includes a negative impression of a molded part, and a core;

FIG. 2 shows the layer graduation and porosity of the molded part;

FIGS. 3a, 3b show two types of sealing;

In principle, identical parts are provided with identical reference numerals in the figures.

DETAILED DESCRIPTION OF THE INVENTION

Figure 4:
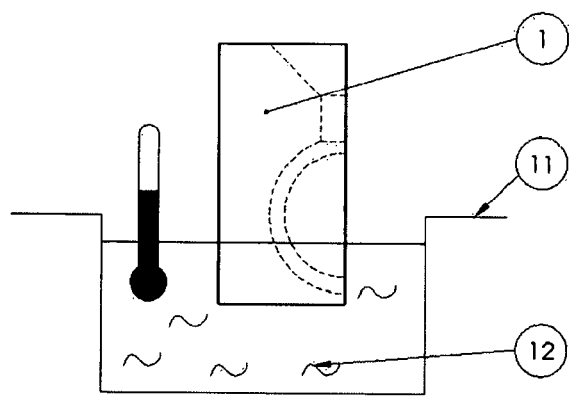
FIG. 4 shows an immersion bath, including a casting mold.

FIG. 1 shows water-soluble casting mold 1, which is used in a specific embodiment of the method according to the invention. Casting mold 1 has a negative impression 3 of the outer shape of the molded part to be produced. A core 4, which is disposed within negative impression 3, is also shown in the exemplary embodiment illustrated. Casting mold 1 has a filling opening 2 for the purpose of filling casting mold 1 with a hardening material. Additive layering methods may be used to produce molds 1 and cores 4. Due to the extraordinary degree of freedom in selecting the particulate material, a 3D printing method is particularly preferably used.

Based on a sectional view, FIG. 2 shows an example of layer structure 5 as well as resulting porosity 6 of a casting mold 1 produced with the aid of a powder bed-based layering method. In the 3D printing method used, a coater applies particulate material or a mixture of particulate material and binder in layers onto a building platform, each layer 5 being precisely leveled. A binder or a liquid that activates the binder is subsequently applied with the aid of an ink-jet print head. This application corresponds to a sectional view of the mold to be produced. Current layer 5 is lowered, and the cycle begins all over again with a new coating. The cycle repeats until the totality of the sectional views results in the desired casting mold 1. Following a certain rest time, casting mold 1 may be removed, and the unbound particulate material may be cleaned therefrom. A drying step or a heat treatment may be subsequently carried out for solidification purposes. This step must be set in such a way that the water solubility of casting mold 1 is not lost.

Two ways to seal the surface of a casting mold 1 using a water-insoluble material are shown in FIGS. 3a and 3b. FIG. 3a shows a superficial seal, the water-insoluble material having formed a sealing layer 9 on the surface of casting mold 1. Pores 8 between individual particles 7, which form an open-pore network, are apparent beneath sealing surface 9. Sealing surface 9 prevents the hardening material from entering pores 8 when casting mold 1 is filled therewith, which would cause the surface properties of the casting produced with the aid of the hardening material to deteriorate. FIG. 3b shows a sealing method, in which water-insoluble material 10 penetrates and thus seals the network of pores 8. The latter sealing method takes place, in particular, when using a water-insoluble material which has a low viscosity. Depending on the viscosity of the water-insoluble material, mixed forms of the two sealing methods in FIGS. 3a and 3b also result.

FIG. 4 shows a schematic view of an immersion bath 11, which enables a casting mold 1 to be introduced into liquefied, water-insoluble material 12. A seal over the entire surface of casting mold 1 may be achieved relatively quickly by introducing a casting mold 1 into an immersion bath 11 of this type.

The sealing step is necessary to prevent the casting mold from interacting with the hardening material and to ensure a high surface quality. For example, no water may penetrate the casting mold while it is being filled with concrete, since the loss of water would cause the flowability of the concrete to be lost, and only an unsatisfactory filling of the mold would be achieved thereby. In addition, the seal may help achieve better surface qualities. A chemical reaction between the hardening material and the binder or particulate material of the casting mold may also be prevented.

Figure 5:
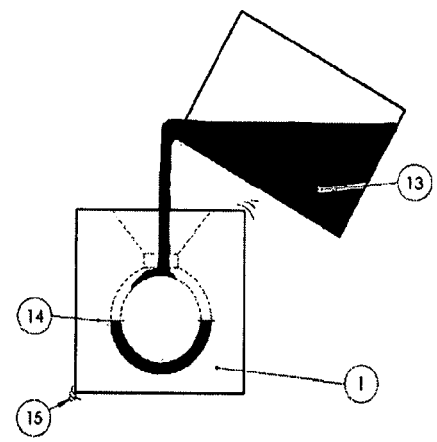
FIG. 5 shows the filling of the casting mold with a hardening material.

FIG. 5 shows the step of filling casting mold 1 with hardening material 13. Hardening material 13 is filled into negative impression 4 in free-flowing form via filling opening 3 of casting mold 1. A vibration 15 may be applied to casting mold 1 with the aid of a suitable device, such as a shaking table.

The filling of the casting mold may be carried out as a pure gravity casting process. No special precautions need to be taken for this purpose. The hardenable material should have a low viscosity, and the design of the casting mold should allow displaced air to escape through the rising level of the material.

Figure 6:
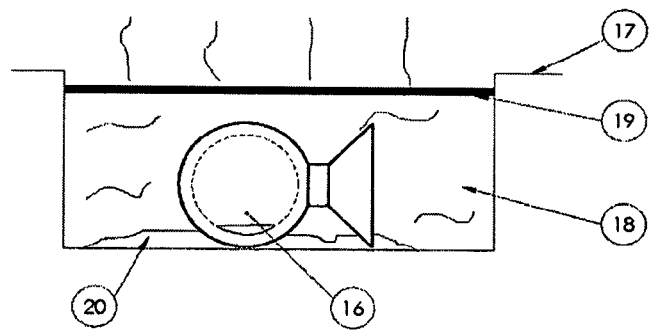
FIG. 6 shows a first specific embodiment of a bath for dissolving the casting mold.

FIG. 6 shows a molded part 16 after material 13 has been hardened in a bath 17 made of an aqueous solution 18. In illustrated bath 17, aqueous solution 18 is heated to speed up the dissolution of casting mold 1. In the specific embodiment illustrated, particulate material 20 of the dissolved casting mold collects on the bottom of bath 17, while the melted, water-insoluble material forms a layer 19 on the surface of aqueous solution 18. This layer 19 may be subsequently simply skimmed off the surface of aqueous solution 18 and reused, while particulate material 20 may be filtered out of aqueous solution 18.

Figure 7:
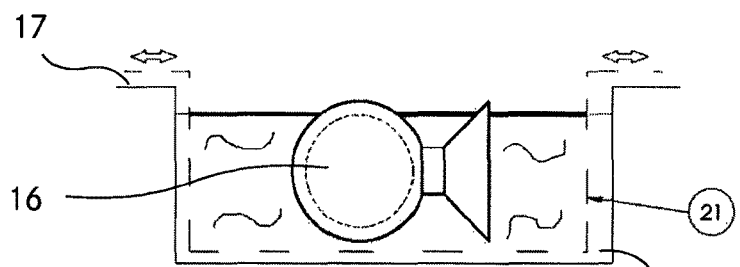
FIG. 7 shows a second specific embodiment of a bath for dissolving the casting mold.
Figure 8:
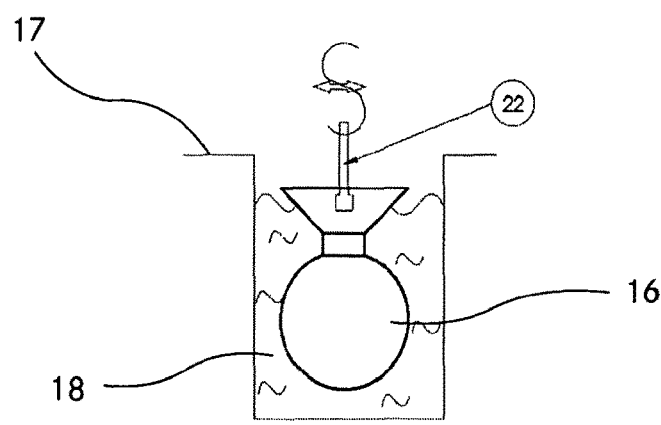
FIG. 8 shows a third specific embodiment of a bath for dissolving the casting mold.

FIGS. 7 and 8 show two other preferred specific embodiments of a bath 17 containing an aqueous solution 18. In the specific embodiment illustrated in FIG. 7, molded part 16 is additionally set in motion in aqueous solution 18 with the aid of a grating 21. In the specific embodiment in FIG. 8, molded part 16 is shifted in the aqueous solution with the aid of a gripper 22, which grips molded part 16 or is cast therein.

Figure 9:
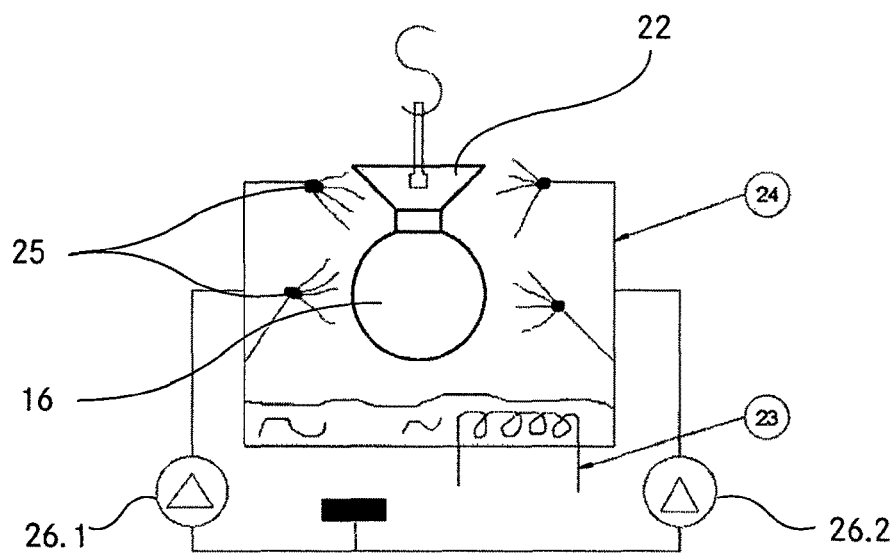
FIG. 9 shows an atomizing chamber for dissolving the casting mold.

Another specific embodiment for dissolving casting mold 1 is shown in FIG. 9. In this specific embodiment, molded part 16 is held within an atomizing chamber 24, hot water being sprayed onto casting mold 1 or onto molded part 16 via multiple spray heads 25. The water collecting on the bottom of atomizing chamber 24 may be subsequently separated from the dissolved material of the casting mold as well as from the water-insoluble material through suitable filters, heated with the aid of a heating element 23 and resprayed onto the casting mold or onto molded part 16 via spray heads 25 with the aid of pumps 26 (26.1, 26.2).

What is claimed is:

1. A method for producing a molded part, comprising the following steps:
   a) producing a water-soluble casting mold using a layering method, wherein the layering method is a powder bed-based layering method where particulate material is applied in thin layers and selectively printed upon with a computer-controlled print head;
   b) sealing the surface of the casting mold with a sealing material including at least one water insoluble material;
   c) generating a casting of the molded part by filling the casting mold with a free-flowing, hardenable material; and
   d) dissolving the casting mold with the aid of an aqueous solution, characterized in that the casting mold is produced in a 3D printing method;
   wherein the particulate material includes a sand, a gypsum, a metal, or a ceramic powder:
   the sealing material penetrates pores between individual particles of the casting mold;
   a material of the casting mold in the layering method includes a binder;
   the hardenable material is capable of a binding action with the binder or the partiuclate material, and
   the sealing material prevents the binding action.

2. The method according to claim 1, characterized in that the surface of the casting mold is sealed by immersion in a bath, by being sprayed and/or by being brushed with the sealing material.

3. The method according to claim 1, characterized in that an underpressure above an ambient pressure or an overpressure below the ambient pressure is applied to the casting mold when it is filled with the free-flowing, hardenable material, and/or the casting mold is subjected to a shaking motion or a temperature increase.

4. The method according to claim 1, characterized in that the casting mold is dissolved by immersion in a bath containing the heated aqueous solution.

5. The method of claim 4, wherein the dissolution is accelerated by:
movements of the casting mold within the bath; or
the application of ultrasound.

6. The method according to claim 1, characterized in that the hardenable material includes a casting polyamide.

7. The method of claim 1, wherein the free-flowing, hardenable material is a hydraulically setting material.

8. The method of claim 1, wherein the aqueous solution is a heated aqueous solution.

9. The method of claim 7, wherein the water-soluble casting mold includes at least one water-soluble binder.

10. The method of claim 9, wherein the at least one water-soluble binder includes at least one inorganic compound.

11. The method of claim 10, wherein the at least one water-soluble binder includes at least one polysaccharide, at least one salt and/or at least one water-soluble polymer, or a mixture thereof.

12. The method of claim 9, wherein the sealing material includes a water-insoluble material including a wax or a water-insoluble polymer.

13. The method of claim 12, wherein
the surface of the casting mold is sealed by immersion in a bath, by being sprayed and/or by being brushed with the sealing material;
an underpressure above an ambient pressure or an overpressure below the ambient pressure is applied to the casting mold when it is filled with the free-flowing, hardenable material, and/or
the casting mold is subjected to a shaking motion or a temperature increase; and
the casting mold is dissolved by immersion in a bath containing the aqueous solution, the dissolution being accelerated by movements of the casting mold within the bath or by a temperature increase and/or by the application of ultrasound.

14. The method of claim 1, wherein the water-soluble casting mold is produced from a material system including
a) at least one water-soluble material for building a casting mold in a layering method, which comprises at least one particulate material as well as at least one water-soluble binder; and
b) the sealing material for sealing the surface of the casting mold.

15. The method of claim 14, wherein the sealing material for sealing the surface of the casting mold includes a wax, at least one fatty acid, at least one water-insoluble polymer, stearyl alcohol and/or cetyl alcohol, or a mixture thereof.

16. The method of claim 15, wherein
the surface of the casting mold is sealed by immersion in a bath, by being sprayed and/or by being brushed with the sealing material;
an underpressure above an ambient pressure or an overpressure below the ambient pressure is applied to the casting mold when it is filled with the free-flowing, hardenable material, and/or
the casting mold is subjected to a shaking motion or a temperature increase; and
the casting mold is dissolved by immersion in a bath containing the aqueous solution, the dissolution being accelerated by movements of the casting mold within the bath or by a temperature increase and/or by the application of ultrasound.

17. The method of claim 1, wherein the dissolving of the casting mold is after the casting has solidified and the aqueous solution is temperature controlled.

18. The method of claim 1, wherein the binding action includes a chemical reaction of the hardenable material with the binder or the partiuclate material, and wherein the sealing material prevents the chemical reaction.

19. The method of claim 1, wherein the method includes a step of washing the water-insoluble material off of the molded part.

20. The method of claim 1, wherein the hardenable material includes a free-flowing material that transitions to a hardened state by a polymerization reaction.

21. The method of claim 1, wherein the casting mold has a rough surface and the sealing material smooths the surface.

22. The method of claim 1, wherein the casting mold is cleaned and a surface is mechanically processed before the step of sealing.

23. The method of claim 1, wherein the sealing material includes a wax, a fatty acid, a water-insoluble polymer, a stearyl alcohol, or a cetyl alcohol.

24. The method of claim 1, wherein the binding action includes hardening by forming a crystalline structure.

25. A method of for producing a molded part, comprising the following steps:
a. producing a water-soluble casting mold using a layering method, wherein the layering method is a powder bed-based layering method where particulate material is applied in thin layers and selectively printed upon with a computer-controlled print head;
b. sealing the surface of the casting mold with a sealing material including a water insoluble material including at least one water insoluble material;
c. generating a casting of the molded part by filling the casting mold with a free-flowing, hardenable material; and
d. dissolving the casting mold with the aid of a heated aqueous solution, wherein the casting mold is produced in a 3D printing method;
the sealing material penetrates pores between individual particles of the casting mold;
a material of the casting mold in the layering method includes a binder;
the hardenable material is capable of a binding action with the binder or the partiuclate material, and
the sealing material prevents the binding action.

26. The method of claim 25, wherein
the surface of the casting mold is sealed by immersion in a bath, by being sprayed and/or by being brushed with the sealing material;
an underpressure above an ambient pressure or an overpressure below the ambient pressure is applied to the casting mold when it is filled with the free-flowing, hardenable material, and/or
the casting mold is subjected to a shaking motion or a temperature increase; and
the casting mold is dissolved by immersion in a bath containing the aqueous solution, the dissolution being accelerated by movements of the casting mold within the bath or by a temperature increase and/or by the application of ultrasound;
and wherein the sealing material includes a wax, at least one fatty acid, at least one water-insoluble polymer, stearyl alcohol and/or cetyl alcohol, or a mixture thereof.

* * * * *